United States Patent
Pisklak et al.

(10) Patent No.: US 9,765,253 B2
(45) Date of Patent: Sep. 19, 2017

(54) LIGHTWEIGHT HOLLOW PARTICLES FOR USE IN CEMENTING

(71) Applicant: Baker Hughes Incorporated, Houston, TX (US)

(72) Inventors: Thomas J. Pisklak, Cypress, TX (US); Elizabeth G. Morillo, The Woodlands, TX (US); Qi Qu, Spring, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 14/713,558

(22) Filed: May 15, 2015

(65) Prior Publication Data

US 2016/0137902 A1 May 19, 2016

Related U.S. Application Data

(62) Division of application No. 13/328,032, filed on Dec. 16, 2011, now Pat. No. 9,033,040.

(51) Int. Cl.

| | |
|---|---|
| B32B 5/16 | (2006.01) |
| C04B 18/02 | (2006.01) |
| C09K 8/473 | (2006.01) |
| C09K 8/467 | (2006.01) |
| C04B 38/08 | (2006.01) |
| C04B 20/12 | (2006.01) |
| C04B 38/00 | (2006.01) |
| C04B 14/10 | (2006.01) |
| E21B 33/13 | (2006.01) |
| C04B 14/24 | (2006.01) |

(52) U.S. Cl.
CPC ............ *C09K 8/473* (2013.01); *C04B 14/104* (2013.01); *C04B 18/027* (2013.01); *C04B 20/12* (2013.01); *C04B 38/009* (2013.01); *C04B 38/08* (2013.01); *C09K 8/467* (2013.01); *C04B 14/24* (2013.01); *E21B 33/13* (2013.01); *Y10T 428/2991* (2015.01); *Y10T 428/2996* (2015.01)

(58) Field of Classification Search
CPC ........ C09K 8/467; C09K 8/473; C04B 14/02; C04B 14/04; C04B 14/104; C04B 18/021; C04B 18/023; C04B 18/027; C04B 28/001; C04B 28/24; Y10T 428/2991; Y10T 428/2996
USPC ................................................. 428/403, 406
See application file for complete search history.

(56) References Cited

U.S. PATENT DOCUMENTS 4,548,767 A * 10/1985 Hendricks ................ B01J 13/04
264/10
4,751,202 A * 6/1988 Toussaint ................ C03C 1/006
428/406

(Continued)

OTHER PUBLICATIONS

Halliburton Technical Data Oil Well Cements and Cement Additives, 1995.*

*Primary Examiner* — Holly Le
(74) *Attorney, Agent, or Firm* — John Wilson Jones; Jones Delflache LLP

(57) ABSTRACT

A lightweight composite having an activated surface contains a lightweight hollow core particle having cement grains which may be adhered to the hollow core or embedded in the surface of the hollow core. The hollow core particle may be prepared from calcium carbonate and a mixture of clay, such as bentonite, and a glassy inorganic material, such as glass spheres, glass beads, glass bubbles, borosilicate glass and fiberglass.

20 Claims, 2 Drawing Sheets

(56) References Cited

U.S. PATENT DOCUMENTS

| | | | | |
|---|---|---|---|---|
| 4,810,675 | A | * | 3/1989 | Dejaiffe .................. C08K 7/28 501/31 |
| 7,666,505 | B2 | * | 2/2010 | Datta .................... C03C 11/002 423/118.1 |
| 7,998,571 | B2 | * | 8/2011 | Lyons ...................... B32B 3/26 428/312.2 |
| 8,117,867 | B2 | * | 2/2012 | Yamaguchi ........... C03B 19/102 65/21.3 |
| 2006/0174803 | A1 | * | 8/2006 | Caveny ................ C04B 18/021 106/646 |
| 2008/0096018 | A1 | * | 4/2008 | Zhang .................... C04B 14/24 428/402 |

* cited by examiner

LIGHTWEIGHT HOLLOW PARTICLES FOR USE IN CEMENTING

This application is a divisional application of U.S. patent application Ser. No. 13/328,032, filed on Dec. 16, 2011, now U.S. Pat. No. 9,033,040.

FIELD OF THE INVENTION

A lightweight particle and composites containing the lightweight particle as hollow core and cement grains adhered to and/or embedded in the hollow core for use in cementing a casing to a wellbore.

BACKGROUND OF THE INVENTION

Hydraulic cements are cements that set and develop compressive strength due to hydration. Such cements can therefore be set under water. As such, hydraulic cements are often used for cementing pipes or casings within a wellbore.

In a typical cementing operation, casing is lowered into the wellbore. A cementitious slurry is then pumped into the casing and a plug of fluid, such as drilling mud or water, is then pumped behind the cement slurry in order to force the cement up into the annulus between the exterior of the casing and the borehole. The cement slurry is then allowed to set and harden to hold the casing in place.

Successful cementing of the well pipe and casing during oil and gas well completion requires the cement slurry to have several important properties. For instance, the cement slurry must be pumpable and capable of being set within a practical time. In addition, settling of cement particles within the slurry must be minimal. Further, the slurry should be capable of exhibiting fluid loss control.

Under normal conditions, cementitious slurries having a density of approximately 15.0 ppg are desired and the cement in such slurries is typically Portland cement. Such slurries quickly develop compressive strength upon introduction to a subterranean formation, typically within 48 hours from introduction. As time progresses, the cement develops greater strength while hydration continues.

In some locations, the subterranean zones or formations into or through which wells are drilled are weak and, as such, are characterized by high permeability, low compressive strength and low tensile strength. The resistance of such subterranean zones or formations to shear is therefore low and such zones or formations typically have very low fracture gradients. When a well fluid, such as a hydraulic cementitious slurry, is introduced into a wellbore penetrating such a subterranean zone or formation, the hydrostatic pressure exerted on the walls of the wellbore may exceed the fracture gradient of the zone or formation. Fractures may form in the zone or formation and the cementitious slurry may be lost in such fractures.

When formations are either unable to support high hydrostatic pressures or are highly permeable, it is desirable to use low density cementitious slurries. A lightweight cement exerts a lower hydrostatic pressure on the formation compared to conventional cements. Cementitious slurries containing lightweight cements are also used to reduce the numbers of stages required for cementing deep wells. Such slurries often therefore minimize operating costs and hazards associated with multistage cementing.

Certain specifications must be met in order for lightweight cement slurries to be acceptable replacements for conventional cementitious slurries. In addition to exhibiting suitable compressive strength and tensile strength, lightweight cement slurries must be easy to mix (no settling) and be easy to blend (no solid segregation).

Several methods are currently used to produce lightweight cement slurries. For instance, excess water may be added to the cementitious slurry for the purposes of lowering the density of the slurry. In other instances, the slurry may be foamed. In still other instances, density modifying extenders, such as hollow pozzolanic, glass spheres or synthetic spheres, may be added to the slurry.

Although each of these methods has produced lightweight cementitious slurries with some degree of success, none of these methods fulfill all the requirements stated above. For instance, while water extended cements render slurries having lower densities, they also produce lower quality cement. Foamed cementitious slurries present challenges in design and field execution, require special equipment (for example, high pressure cryogenic pumps and liquid nitrogen tanks) and highly skilled personnel. Further, when nitrogen is used, the base cement slurry can only be expanded by 25-30% while retaining the mechanical properties of the original slurry. Hollow pozzolanic spheres are generally unsuitable for cement slurries with densities lower than 10.0 ppg and typically will not resist hydrostatic pressures higher than 3,000 psi. Further, since such spheres are a by-product of coal burning operations, they exhibit significant variations in densities and a wide particle size distribution, which increases the difficulty of job design. Borosilicate glass spheres exhibit a much tighter particle size distribution but their extremely low density challenges job design and field execution. Further, the alternatives for lowering the density of the slurry presently offered all employ non-reactive lightweight additives. These additives do not contribute to, and may hinder, the development of strength and other desirable properties in the cement.

Alternatives have been sought for lightweight materials for slurries which may be used in the cementing of pipes and casings within a wellbore and which further improve the physical properties of the set cement and facilitates easy handling of the slurry.

SUMMARY OF THE INVENTION

A hollow particle for use in cementing may be prepared by heating calcium carbonate, clay and an inorganic material such as inorganic glass to the temperature at which calcium carbonate decomposes and the inorganic material begins to melt. As the inorganic material begins to melt, gases are evolved. The gases cause the semi-molten inorganic material to expand outwardly which produces a sphere having a hollow interior. The presence of clay imparts rigidity to the inorganic material and allows the hollow core to retain its shape at elevated temperatures.

The inorganic material is preferably a glass such as glass spheres, glass beads, glass bubbles, borosilicate glass and fiberglass. The clay is preferably bentonite.

A composite containing the lightweight hollow particle as the core may have cement grains adhered to the lightweight hollow core or embedded in the surface of the lightweight hollow core. The composite may be introduced in a slurry to cement a well casing within a wellbore. Composites containing the lightweight hollow core are easier to handle and use than conventional extenders which are present as separate components in a mix containing powder cement.

The composite may be prepared by at least partially coating the lightweight hollow core particle, such as with a coating resin, resin adhesive or tackifying resin. Dry cement may then be applied onto the coated particle. Upon hardening or curing, the cement bonds to the surface of the lightweight particle to form the composite.

Alternatively, the composite may be prepared by mixing lightweight hollow particles with cement powder and then heating the mixture to the glass transition temperature, $T_g$, of the lightweight hollow particle. Once the particles reach their softening point, cement grains are embedded in their surfaces.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
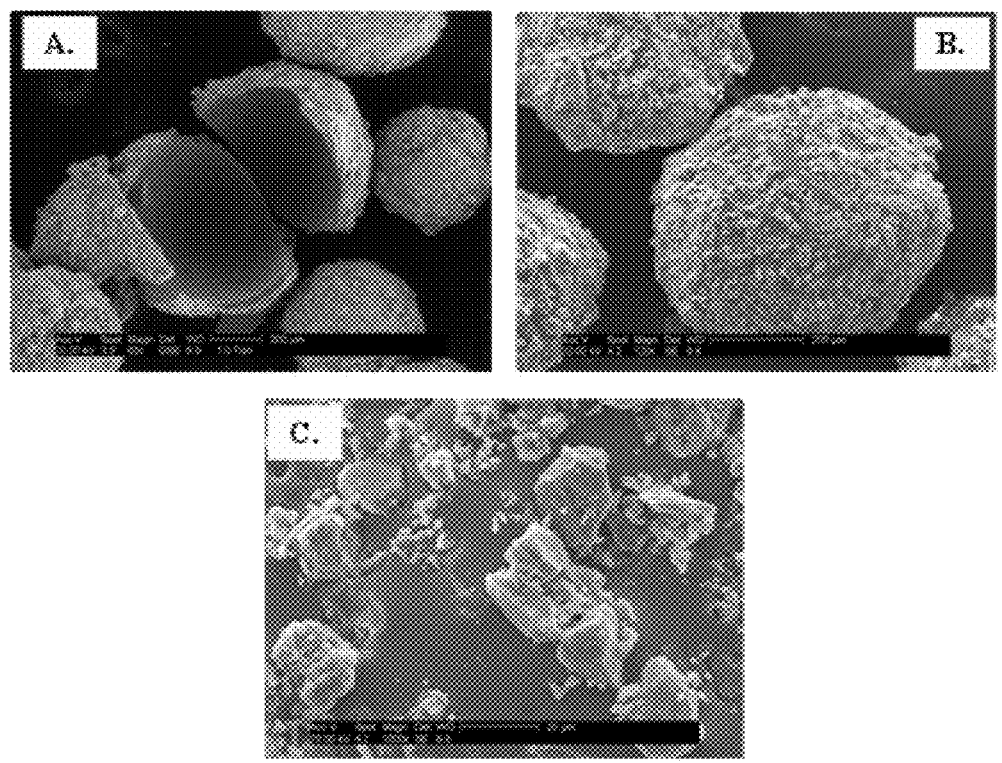
FIG. 1 are scanning electron micrographs of lightweight hollow spheres and lightweight particles described herein, wherein "A." shows the hollow interior of the lightweight hollow spheres; "B." shows cement grains adhered to the surface of the spheres; and "C." shows the cement grains embedded in the surface of the spheres.

A lightweight composite for use in cementitious slurries may contain a lightweight hollow particle as the core and cement adhered to the hollow core, embedded in the hollow core or both adhered to and embedded in the hollow core. Typically, the particle size of the lightweight hollow particle is between from about 10 micrometers to about 1000 micrometers.

The composite may be introduced in a slurry to cement a well casing within a wellbore.

The composite may be of any geometrical shape or may be amorphous based on the shape of the lightweight core. Typically, the composite is spherical and contains a core composed of lightweight hollow spheres.

The hollow core may be prepared from calcium carbonate and a mixture comprising clay and an inorganic material. Typically, the weight ratio of calcium carbonate to mixture is between from about 1:20 to about 10:20, more typically between from about 2:20 to about 5:20. Typically, the mixture, which is combined with the calcium carbonate, may contain between from about 5 to about 50% by weight clay and between from about 50 to 95% per weight inorganic material.

The inorganic material is usually selected from inorganic glass, pozzolanic microspheres and/or ceramic spheres. Suitable inorganic glasses include glass spheres, glass beads, glass bubbles, borosilicate glass and fiberglass. In a preferred embodiment, the inorganic glass is borosilicate glass. The inorganic material is ideally chosen such that the melting range of the inorganic material relative within the temperature range which calcium carbonate undergoes outgassing.

The particle size of the clay is preferably a few nanometers to 100 micrometers. The clay normally acts as a binder and/or composition modifier in the formation of the lightweight hollow spheres. As a binder, the clay adheres the calcium carbonate to the inorganic material. Typically, an inorganic glass is used in combination with the clay.

Typically, the clay is bentonite. Preferred bentonites are sodium bentonite or calcium bentonite or a mixture of thereof. When used with glass, bentonite is most preferred since its melting point (greater than 1200° C.) is greater than the melting point of glass. As such, bentonite does not melt during the production of the lightweight hollow core described herein but remains rigid. As a result, bentonite imparts rigidity to the glass and allows the hollow core to retain its shape at elevated temperatures. Thus, bentonite may act as a composition modifier by controlling the strength and density of the lightweight hollow core.

Typically, the density of the lightweight hollow core particle is between from about 0.6 g/cc to about 1.1 g/cc, more typically between from about 0.7 g/cc to about 0.8 g/cc.

The formation of the lightweight hollow core is based on the concerted decomposition of calcium carbonate and melting of the inorganic material at elevated temperatures. For instance, when bentonite is used in combination with inorganic glass, the inorganic glass begins to melt at or around the same temperature at which the calcium carbonate decomposes into calcium oxide and releases carbon dioxide gas which causes expansion of the glass. It is desirable not to over melt the glass in order to avoid the formation of bubbles in the core.

Typically, calcium carbonate and the mixture of clay and inorganic material is heated to a temperature between from about 650° C. to about 850° C. As the inorganic material begins to melt, gases which are evolved during decomposition cause the semi-molten glassy inorganic material to expand from the interior out. This produces a hollow space within the glassy composition, forming the hollow core.

In an exemplary synthesis, a precursor powder containing calcium carbonate and the mixture of clay and inorganic material is introduced into a mixer. Water in an amount sufficient to cause agglomeration of the precursor powder during mixing may also be added. The particle size of the calcium carbonate, clay and inorganic material is typically less than 325 mesh.

Preferred mixers are those having a horizontal or inclined pan (typically circular) rotatable at a speed of from about 10 to about 80 revolutions per minute (rpm) and a rotatable impacting impeller which preferably is designed to rotate from about 500 to about 1400 rpm. The direction of rotation of the pan is desirably opposite that of the impeller, causing the precursor powder added to the mixer to flow over itself in countercurrent manner. The central axis of the impacting impeller is preferably located within the mixer at a position off center from the central axis of the rotatable pan. The pan may be in a horizontal or inclined position, wherein the incline, if any, is between 0 and 35 degrees from the horizontal. Suitable mixers include Eirich mixers, commercially available from Eirich Machines, Inc.

After the precursor powder and optional water is added to the mixer, the pan may be rotated from about 10 to about 80 rpm and, more preferably, from about 60 to about 80 rpm, and the impacting impeller is preferably rotated from 550 to 1100 rpm, more preferably, from about 1000 to about 1150 rpm.

During mixing, a binder may optionally be used to ensure that the particles remain agglomerated before heat treatment. When present, the amount of binder is between from about 1 to 10, more typically between from about 3 to 5, weight percent of the total amount of binder and precursor powder in the mixer. In an alternative embodiment, the binder may be sprayed onto the powder while the powder is being rotated.

Suitable binders may include starch, polyvinyl alcohol, gum arabic, lignosulfonates, molasses, dextrins, poly vinyl pyrrolidone, acrylics, polyethyleneimine, methyl cellulose, hydroxypropylmethyl cellulose, hydroxyethyl cellulose, carboxymethyl cellulose, sodium alginate, polyacrylamide, xanthan gum, and guar gum. In a preferred embodiment, the binder is sodium carboxymethyl cellulose.

Following mixing, the wet mixture containing the agglomerated particles may be dried at a temperature of approximately 100° C. for 8 to 15 hours. In a preferred embodiment, the wet mixture is dried in a vacuum oven at approximately 100° C. for approximately 4 hours.

The agglomerated dried particles are then sized, for example, by subjecting them to a flour mill, ball mill, rotary mill, etc. The desired size for the dried particles is between from about 70 to about 180 μm. The particles may further be passed through a sieve to ensure a desired uniform particle size.

In one embodiment, the dried agglomerated sized particles may be admixed with dry cement and an optional parting agent. When used, the weight ratio of the lightweight particles to dry cement is between from about 5:80 to about 10:60.

Suitable parting agents are known in the art and include bentonite (such as sodium bentonite and calcium bentonite) and substituted quaternary compounds, such as those disclosed in U.S. Pat. Nos. 7,597,148; 6,152,993; 6,015,929; and 6,025,302, herein incorporated by reference. The parting agent assists in keeping components of the mixture which have not been agglomerated separate from the agglomerated particles.

The admixture is then heated to the glass transition temperature, $T_g$, of the inorganic material, typically between from about 650° C. to about 850° C. (approximately 700° C. for glass and 800° C. for borosilicate glass). In a preferred embodiment, the admixture is heat treated at a rate of 10° C./min. The temperature is then decreased and in some cases may be rapidly cooled. During the heat treatment, while the core particles are semi-molten, the cement grains are embedded in the outer surface of the lightweight hollow core particles. Upon cooling, at least a portion of the cement grains permanently adhere to or are embedded within the lightweight hollow core particles.

In another embodiment of the invention, at least a portion of the lightweight hollow particles may be treated with a coating such as a coating resin, resin adhesive or tackifying resin. Dry cement may then be applied onto the coated surface. Upon hardening or curing, the cement bonds to the surface of the spheres. Lightweight hollow particles treated with coating and then dry cement applied may not necessarily be made through the process described above. Such hollow particles could be hollow pozzolanic particles, glass or synthetic hollow spheres commonly used in cement slurry as extenders.

In this process, the dried agglomerated sized particles are first subjected to heating prior to the addition of a resin coating or the cement particles. After the mixture is heated to the $T_g$ of the inorganic material, preferably in the manner outlined above, the coating is applied. The lightweight hollow core particles may be cooled prior to the application of the resin coating. For instance, where the resin is water based or epoxy based, the resin, the hollow particles are cooled prior to the application of the resin. The hollow particles are typically not cooled when the coating is melt dependent. The amount of coating on the resulting coated particles is typically between from about 3 to about 10, preferably from 3 to 5, weight percent based on the weight of the coated particles.

Suitable materials for coating of the lightweight hollow core particles include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacryate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof.

The cement may be applied to the coated hollow particles at room temperature or the coating may be cured prior to the application of the cement. The amount of cement adhered to the resin coating is typically between 10 to about 20 weight percent based on the weight of the cement containing composite. Curing of the resin may then occur at room temperature of at elevated temperature. The bonds between the hollow spheres and cement grains is stronger than bonding which may occur between cement grains and conventional extenders, such as pozzolanic or glass beads, which do not contain a reactive surface.

In an alternative method, lightweight particles having embedded cement grains may prepared by mixing clay and the inorganic material and an optional binder. Powdered cement may then be introduced to the spheres. The mixture is then dried. For instance, the mixture may be dried in a vacuum oven at 100° C. Drying time may extend up to 4 hours. The spheres with the cement powder may then be heat treated at a rate of 10° C./min to $T_g$. During the heat treatment, while the spheres are semi-molten, cement grains are embedded in the outer surface of the lightweight particle. The spheres are then naturally cooled upon removal from the heat source. Upon cooling, at least a portion of the cement grains permanently adhere to the spheres, thereby creating lightweight particles having active surfaces into which cement grains are embedded.

Lightweight composites synthesized in a single stage (wherein cement is added directly to the dried agglomerated particles) are typically characterized by a higher apparent density than lightweight composites synthesized in two or more stages (e.g., where the cement is applied after application of a resin coating). For instance, the apparent density of lightweight particles made in a single stage may be between 0.90 to 0.98 g/cc whereas the apparent density of lightweight particles prepared in two or more stages may be between 0.70 to 0.80 g/cc. The apparent density of composites prepared in a single stage is slightly higher due to the inclusion of the higher density cement powder (having an approximate density of 3.2 g/cc) on the surface of the composite.

Unlike conventional extenders composed of non-reactive particles which may interfere with the mechanical properties of the cement, the surface active composites defined herein may be used as standard cement grains. Thus, the cementitious slurry may be free of conventional extenders which fail to provide a surface reaction between the extender and the cement grain.

Any of the oil well type hydraulic cements of the class "A-H" as listed in the API Spec 10A, (22nd ed., January 1995 or alternatively ISO 10426-1), may be suitable for use as the cement for adhering to or being embedded within the hollow microspheres. Especially preferred is Portland cement, preferably an API Class A, C, G or H cement. Most preferred, are Class C and H Portland cements. Class C cement is typically used for shallower to moderate wells whereas Class H Portland cement is typically used for moderate to deep well applications. Such cements may further be admixed (prior to interaction with the hollow microspheres) with aluminous cements, pozzolan cements, fly ash cements, and the like.

Cementitious slurries containing the lightweight composites defined herein exhibit lower densities than slurries formulated with conventional lightweight extenders since the reactive cement is adhered to or within the hollow core particles to form cement clinker.

In addition, the intrinsic characteristics of the surface active lightweight composites make handling and field operations simpler. For instance, there is less tendency for separation of the composites, less solid segregation in the slurry and less breakage of equipment when the surface active lightweight composites defined herein are used in place of conventional extenders in combination with cement mixes.

The lightweight composites described herein may be used to prepare cementitious slurries which exhibit ultra low-densities, typically ranging from about 13.0 pounds per gallon (ppg) to about 6.0 ppg or less, preferably from about 10.0 ppg to about 8.0 ppg.

Further, use of the lightweight composites described herein in cementitious slurries provides for excellent particle size uniformity of cement. Set cements from cementitious slurries containing the surface active lightweight composites exhibit high compressive strength; the compressive strength being dependent on slurry density as more dense slurries provide greater compressive strength.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Example 1

A 1.5% carboxymethyl cellulose (CMC) in water solution was prepared by dissolving 1.5 grams of CMC as binder in 98.5 grams of deionized water. A lightweight precursor composition was prepared by mixing 83 g borosilicate glass and 5 g bentonite and then adding 12 g calcium carbonate in a jar mill for about one hour. Prior to mixing the bentonite, glass and calcium carbonate were sieved to be less than 325 mesh. About 200.0 grams of the lightweight particle powder was placed in the pan of the lab scale version of an Eirich mixer. Using an atomizer, 57.0 grams of the 1.5% CMC solution was sprayed onto the powder while the pan was rotated at 74 rpm and the contra rotating impeller at 1250 rpm. The binder solution and powder were allowed to mix at this mixer setting for 2 minutes to form spheres. To prevent the spheres from agglomerating, 40.0 grams of bentonite was added to the pan as a parting agent and this was rotated, without the impeller, for 1 minute. The spheres were then removed from the pan dried at 100° C. under vacuum for 4.0 hours.

The dried spheres were then heated at a rate of 10° C./min to 800° C. for 20 minutes in a muffle furnace. After heating, the lightweight particles were sieved to remove excess bentonite parting agent; the particles had a size between 20 and 40 mesh; the wall thickness of the hollow spheres was in the range of about 5 to about 20 microns and the apparent density of the hollow spheres was 0.77 g/cc. The hollow interior of the spheres is shown in the scanning electron micrograph of FIG. 1. The lightweight particles, while not exhibiting an active surface, may be used as an alternative to lightweight additives in cementitious slurries.

Example 2

This Example describes the preparation of hollow spheres having an active surface. A 1.5% CMC in water solution was prepared by dissolving 1.5 grams of CMC in 98.5 grams of deionized water. About 200.0 grams of lightweight particle precursor powder (<325 mesh) was placed in the pan of the lab scale version of an Eirich mixer. Using an atomizer, 57.0 grams of the 1.5% CMC solution was sprayed onto the powder while the pan was rotated at 74 rpm and the contra rotating impeller at 1250 rpm. The binder solution and powder were allowed to mix at this mixer setting for 2 minutes to form spheres. 600 g of cement powder was added to the pan as the parting agent and this was rotated, without the impeller, for 1 minute. Once dried in a vacuum oven at 100° C. for 4 hours, the spheres were heat treated at a rate of 10° C./min to 800° C. for 20 minutes in a muffle furnace.

During the heat treatment, while the glassy spheres were semi-molten, cement grains were embedded in the outer surface of the lightweight particles. Upon cooling, the cement grains were permanently adhered to the surface of the lightweight particles, as illustrated in FIG. 1. "A.", "B." and "C." are scanning electron micrographs (SEM) of the surface active lightweight particles. "A." of FIG. 1 is a broken sphere showing the hollow interior and "B." of FIG. 1 is a whole sphere with cement grains apparent on the surface. "C." of FIG. 1 is a high magnification image of the surface of the sphere in "B." which shows the cement grains embedded in the surface of the sphere.

The apparent density of the composite was measured as 0.96 g/cc.

Example 3

Following the procedure of Example 1, hollow microspheres were prepared using varying percentages of bentonite clay and glass. Strength of the hollow microspheres was obtained using an Instron 3345 Load Frame to determine the maximum loading the particles could withstand before fracture (each loading being an average of the max loading of 20 particles) and densities were obtained using a Micromeretics AccuPyc 1330 Gas Pycnometer. The results are set forth in Table 1 below:

TABLE 1

Composition versus strength and density of hollow spheres.

| % Glass | % Bentonite | % CaCO$_3$ | SD (g/cc) | Max Load (lbs) |
|---|---|---|---|---|
| 83 | 5 | 12 | 0.77 | 1.4 |
| 78 | 10 | 12 | 1.67 | 3.8 |

TABLE 1-continued

Composition versus strength and density of hollow spheres.

| % Glass | % Bentonite | % CaCO$_3$ | SD (g/cc) | Max Load (lbs) |
|---|---|---|---|---|
| 56 | 32 | 12 | 1.85 | 6.8 |
| 50 | 38 | 12 | 2.10 | 19.6 |

Table 1 demonstrates that higher percentages of bentonite cause the glassy composition to resist expansion and produce less expanded lightweight particles with higher strength and higher density.

Example 4

The strength of the hollow spheres of Example 1 were compared to conventional hollow spheres, most notably, LW-6 (pozzolanic microspheres having a specific gravity of 0.7) and LW-5 and LW-7 (lightweight glass microspheres) (LW-5, LW-6 and LW-7 are commercial extenders available from Baker Hughes Incorporated). Strength was measured by the resistance of the spheres to hydrostatic pressure. Slurries of desired slurry density were prepared from Portland cement and the extender and monitored by a gas pycnometer. Each slurry was then pressurized inside a curing chamber to simulate wellbore pressures. Finally, the density of the slurry was measured again and the volume loss was calculated based on differences from the initial and final density. Reported by a crush rating, Table 2 (summarizing the results of the hydrostatic crush test) shows the change in volume (% volume loss) of the slurry due to sphere breakage at elevated pressures wherein volume losses over 20% are considered a failure.

TABLE 2

| LW Additives in Slurry | Test Pressure (psi) | Slurry Density | % Volume Loss |
|---|---|---|---|
| EX - 1 | 0 | 10.20 | 0 |
|  | 2000 | 10.39 | 13 |
|  | 6000 | 10.43 | 16 |
| LW - 5 | 0 | 10.05 | 0 |
|  | 2000 | 10.26 | 6 |
|  | 6000 | 11.40 | 24 |
| LW - 6 | 0 | 10.02 | 0 |
|  | 2000 | 10.54 | 13 |
|  | 6000 | 11.62 | 35 |
| LW - 7-4 | 0 | 10.02 | 0 |
|  | 2000 | 10.20 | 6 |
|  | 6000 | 11.36 | 39 |

As illustrated in Table 2, surface active lightweight particles of Example 2 only exhibit 16% volume loss at 6000 psi while conventional hollow spheres showed greater volume loss (24%, 35%, and 39%).

Example 5

The strength of cement systems prepared from slurries containing the hollow spheres of Example 1 was compared to set cement prepared from conventional hollow spheres. 2 inch cube cement blocks were prepared by molding and curing the cement composition at 60° C. and 3000 psi for 24 hours. Once cured, the compressive strength was determined using API Recommended Practice 10B-2. The results are set forth in Table 3:

TABLE 3

| LW Additives in Slurry | Compressive Strength (psi) | Slurry Density (ppg) |
|---|---|---|
| EX - 1 | 3996 | 12.4 |
| LW - 5 | 1725 | 12.4 |
| LW - 6 | 2363 | 12.0 |
| LW - 7-6 | 1929 | 12.4 |

Table 3 illustrates that chemical interaction of the lightweight particles with the cement causes dramatic improvement in the compressive strength of the lightweight cement as compared to those of similar slurry density based on conventional hollow spheres. The compressive strength of cement with surface active lightweight particles is 3996 psi versus 1725, 2363, and 1929 psi for LW-5, LW-6, and LW-7-6, respectively.

Example 6

Figure 2:
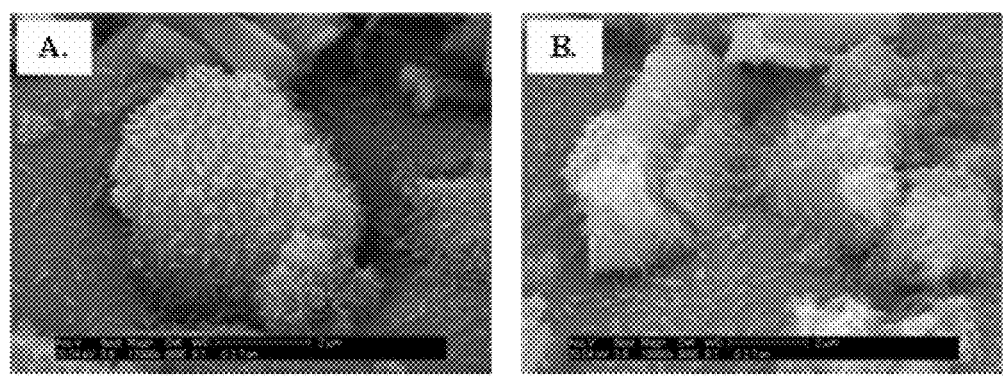
FIG. 2 are scanning electron micrographs of cement grains embedded in the surface of lightweight hollow spheres.

To determine if the surface of the lightweight composite is active, a few grams of surface active lightweight particles of Example 2 were soaked in water for 3 days to hydrate the cement grains. The particles were then dried and imaged with an SEM. The activity of Portland cement, when hydrated, can be observed through the growth of calcium-silicate-hydrate (CSH) gel fibrils, as reported in D. D. Double, et al. *Proc. R. Soc. Lond. A.* 359, 435-451 (1978). "A." and "B." of FIG. 2 are high magnification scanning electron micrographs (SEM's) of the surface of a hydrated particle which show the embedded cement grains with CSH fibrils. The growth of CSH fibrils on the cement grains indicates that the grains are active and will react when used as a lightweight additive in cement.

Example 7

Figure 3:
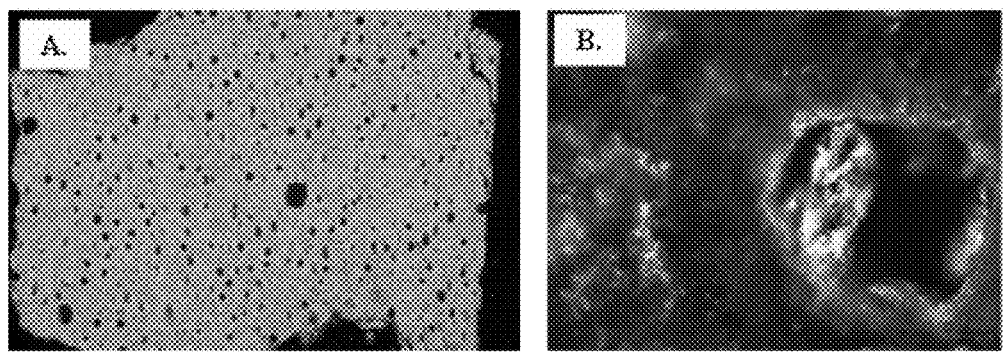
FIG. 3 are scanning electron micrographs demonstrating bonding of the lightweight hollow spheres to cement.

To further demonstrate the activity of the surface active lightweight particles, a cement block was prepared from cement and 25 percent by weight of cement (BWOC) of surface active lightweight particles (40/70 mesh). The block was cured at 60° C. for three days at atmospheric pressure. A thin section was cut from the block and imaged using an optical microscope. "A." of FIG. 3 is an image of the thin section showing the lightweight particles embedded in the cement block. "B." of FIG. 3 is a high magnification of the thin section using a polarized light filter. The image shows crystal growth from the surface of the lightweight particle into the surrounding cement matrix, indicating that the sphere is bound to the cement.

The foregoing disclosure and description of the invention is illustrative and explanatory thereof, and various changes in the size, shape, and materials, as well as in the details of illustrative methodology may be made without departing from the spirit of the invention.

What is claimed is:
1. A composite comprising a hollow core having a density from about 0.6 g/cc to about 1.1 g/cc and cement grains, wherein the hollow core is formed from calcium carbonate, clay and an inorganic material selected from the group consisting of inorganic glass, pozzolanic microspheres and/or ceramic spheres and further wherein the cement grains are adhered to the surface of the hollow core, embedded in the surface of the hollow core or are both adhered to the surface of the hollow core and embedded in the surface of the hollow core.

2. The composite of claim 1, wherein the particle size of the hollow core is between from about 20 to about 40 mesh.

3. The composite of claim 1, wherein at least a portion of the surface of the hollow core is treated with a coating layer and further wherein the cement grains are adhered onto the coating layer.

4. The composite of claim 1, wherein the inorganic material is spherical.

5. The composite of claim 1, wherein the clay is bentonite.

6. The composite of claim 1, wherein the inorganic glass is selected from the group consisting of glass spheres, glass beads, glass bubbles, borosilicate glass and fiberglass.

7. The composite of claim 6, wherein the inorganic glass is borosilicate glass.

8. The composite of claim 7, wherein the hollow core is formed from calcium carbonate and a mixture containing from about 5 to about 50 percent by weight bentonite and from about 50 to about 95 percent by weight borosilicate glass.

9. The composite of claim 1 prepared by treating at least a portion of the hollow core with a coating layer, applying dry cement onto the coating layer, and hardening the cement.

10. The composite of claim 1 prepared by adding cement powder to the hollow core, drying the mixture, heat treating the mixture at a rate of 10° C./min to 800° C., to provide embedment of cement grains from the cement powder into the hollow core, and then cooling the resulting product.

11. A hollow particle prepared by heating dry cement with agglomerated particles wherein the weight ratio of the agglomerated particles to dry cement is from about 5:80 to about 10:60, the agglomerated particles having been prepared from a precursor powder comprising (a) calcium carbonate and (b) a mixture of clay and an inorganic glass wherein (i) the weight ratio of calcium carbonate to the mixture is from about 1:20 to about 10:20, (ii) the mixture contains between from about 5 to about 50% by weight clay and between from about 50 to 95% per weight inorganic glass, and (iii) the dry cement and agglomerated particles are heated to a temperature between from about 650° C. to about 850° C. for a time sufficient to decompose the calcium carbonate and at least partially melt the inorganic glass and further wherein (iv) gases evolved during the heating expand the semi-molten inorganic glass outwardly to render a hollow sphere and (v) the heating further provides embedment of cement grains from the dry cement into the outer surface of the hollow sphere.

12. The hollow particle of claim 11, wherein the particle size of the precursor powder is less than or equal to 325 mesh.

13. The hollow particle of claim 11, wherein a binder is further mixed with the calcium carbonate and the mixture of clay and inorganic glass.

14. The hollow particle of claim 11, wherein the sphere size of the hollow particle is between from about 20 to about 40 mesh.

15. The composite of claim 11, wherein the inorganic glass is selected from the group consisting of glass spheres, glass beads, glass bubbles, borosilicate glass and fiberglass.

16. A composite comprising a hollow core and cement grains, wherein the hollow core is formed from calcium carbonate, clay and an inorganic material selected from the group consisting of inorganic glass, pozzolanic microspheres and/or ceramic spheres and further wherein the cement grains are adhered to the surface of the hollow core, embedded in the surface of the hollow core or are both adhered to the surface of the hollow core and embedded in the surface of the hollow core wherein the composite is prepared by adding cement powder to the hollow core, drying the mixture, heat treating the mixture at a rate of 10° C./min to 800° C., and then cooling the resulting product.

17. The composite of claim 16, wherein at least a portion of the surface of the hollow core is treated with a coating layer and further wherein the cement grains are adhered onto the coating layer.

18. The composite of claim 16, wherein the clay is bentonite.

19. The composite of claim 18, wherein the inorganic material is inorganic glass selected from the group consisting of glass spheres, glass beads, glass bubbles, borosilicate glass and fiberglass.

20. The composite of claim 16, wherein the hollow core is formed from calcium carbonate and a mixture comprising from about 5 to about 50 percent by weight bentonite and from about 50 to about 95 percent by weight borosilicate glass.

* * * * *